US009255594B2

United States Patent
Cabrit et al.

(10) Patent No.: US 9,255,594 B2
(45) Date of Patent: Feb. 9, 2016

(54) REMOVABLE ANCHORING DEVICE USABLE AS A SUSPENSION BOLT

(71) Applicant: ZEDEL, Crolles (FR)

(72) Inventors: Eric Cabrit, Foissac (FR); Paul Cluzon, Cazaunous (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 14/434,577

(22) PCT Filed: Oct. 16, 2013

(86) PCT No.: PCT/EP2013/071638
§ 371 (c)(1),
(2) Date: Apr. 9, 2015

(87) PCT Pub. No.: WO2014/060481
PCT Pub. Date: Apr. 24, 2014

(65) Prior Publication Data
US 2015/0300392 A1    Oct. 22, 2015

(30) Foreign Application Priority Data
Oct. 16, 2012    (FR) ...................................... 12 59862

(51) Int. Cl.
| | |
|---|---|
| A47G 29/02 | (2006.01) |
| F16B 13/00 | (2006.01) |
| A63B 29/02 | (2006.01) |
| F16B 13/06 | (2006.01) |
| F16M 13/02 | (2006.01) |

(52) U.S. Cl.
CPC ................ *F16B 13/00* (2013.01); *A63B 29/02* (2013.01); *A63B 29/024* (2013.01); *F16B 13/065* (2013.01); *F16M 13/022* (2013.01); *F16B 2013/009* (2013.01)

(58) Field of Classification Search
CPC .... F16B 13/0808; F16B 13/08; F16B 13/065; F16B 2013/009; A63B 29/024; A63B 29/02; F16M 13/022
See application file for complete search history.

(56) References Cited

U.S. PATENT DOCUMENTS

| | | | |
|---|---|---|---|
| 3,861,636 A | 1/1975 | Diener | |
| 4,506,924 A | 3/1985 | Nieder | |
| 5,226,768 A * | 7/1993 | Speer | ................. F16B 13/0808 411/21 |
| 6,729,821 B2 | 5/2004 | Guthrie et al. | |
| 7,901,170 B2 * | 3/2011 | Usui | ........................ B25B 5/08 411/34 |

FOREIGN PATENT DOCUMENTS

| | | |
|---|---|---|
| EP | 2243970 A1 | 10/2010 |
| FR | 2411328 A1 | 7/1979 |
| WO | 97/32631 A1 | 9/1997 |

OTHER PUBLICATIONS

Dec. 20, 2013 International Search Report issued in International Patent Application No. PCT/EP2013/071638.

* cited by examiner

*Primary Examiner* — Amy Sterling
(74) *Attorney, Agent, or Firm* — Oliff PLC

(57) ABSTRACT

A removable anchoring device designed to be inserted in a hole drilled in a wall, and designed to support a mechanical load, including a female body provided with a radially expandable front area designed to be inserted in the hole and with a rear stop designed to be outside the hole, a male body slidingly engaged in the female body including an expansion head at its front end, the male body including a rear stop designed to be outside the hole, a flexible compression part fitted in compression between the stop of the female body and the stop of the male body in order to bias the male body and the female body in the direction of engagement of the expansion head in the radially expandable area, the male body presenting a stop part determining a penetration length into the drilled hole.

14 Claims, 3 Drawing Sheets

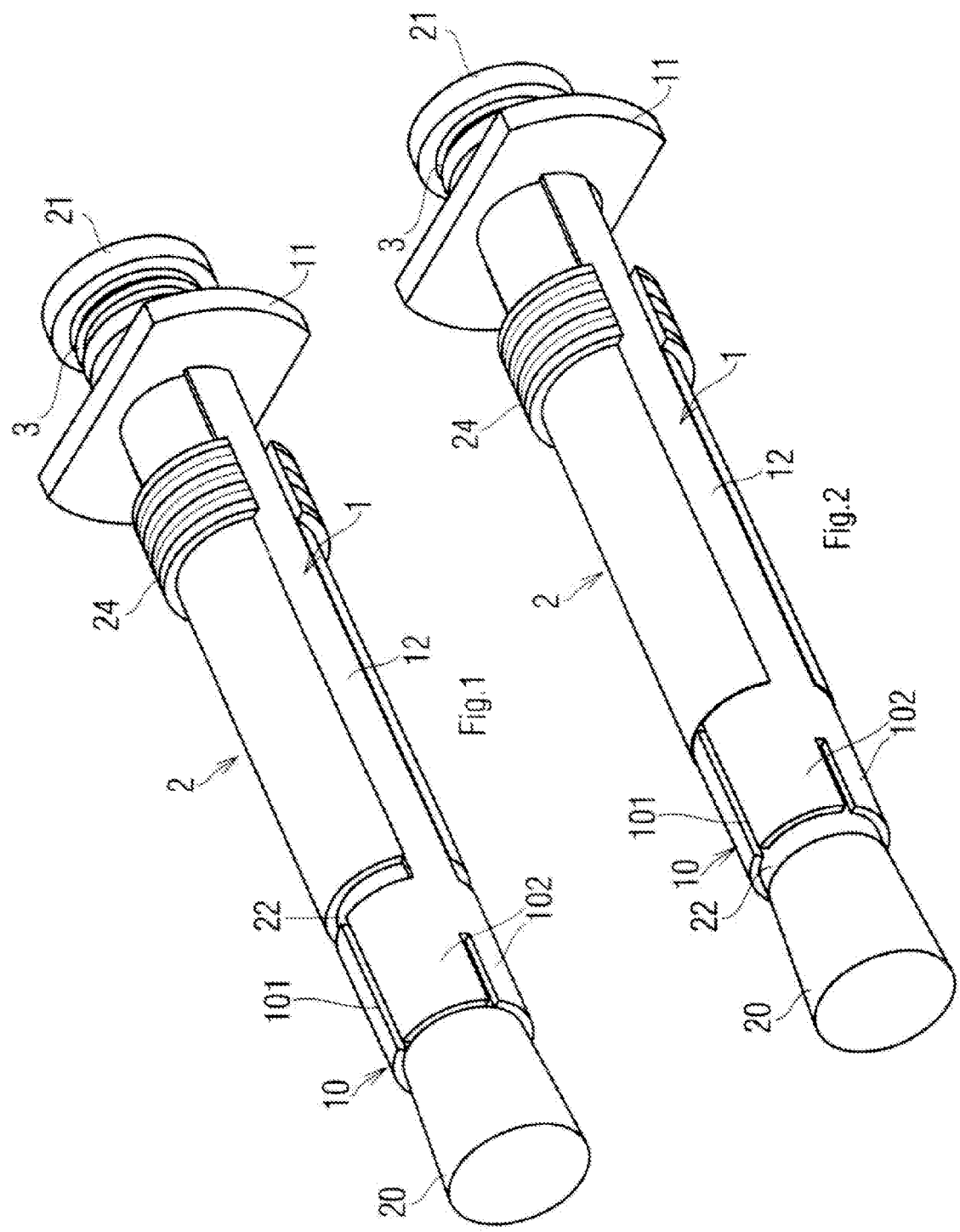

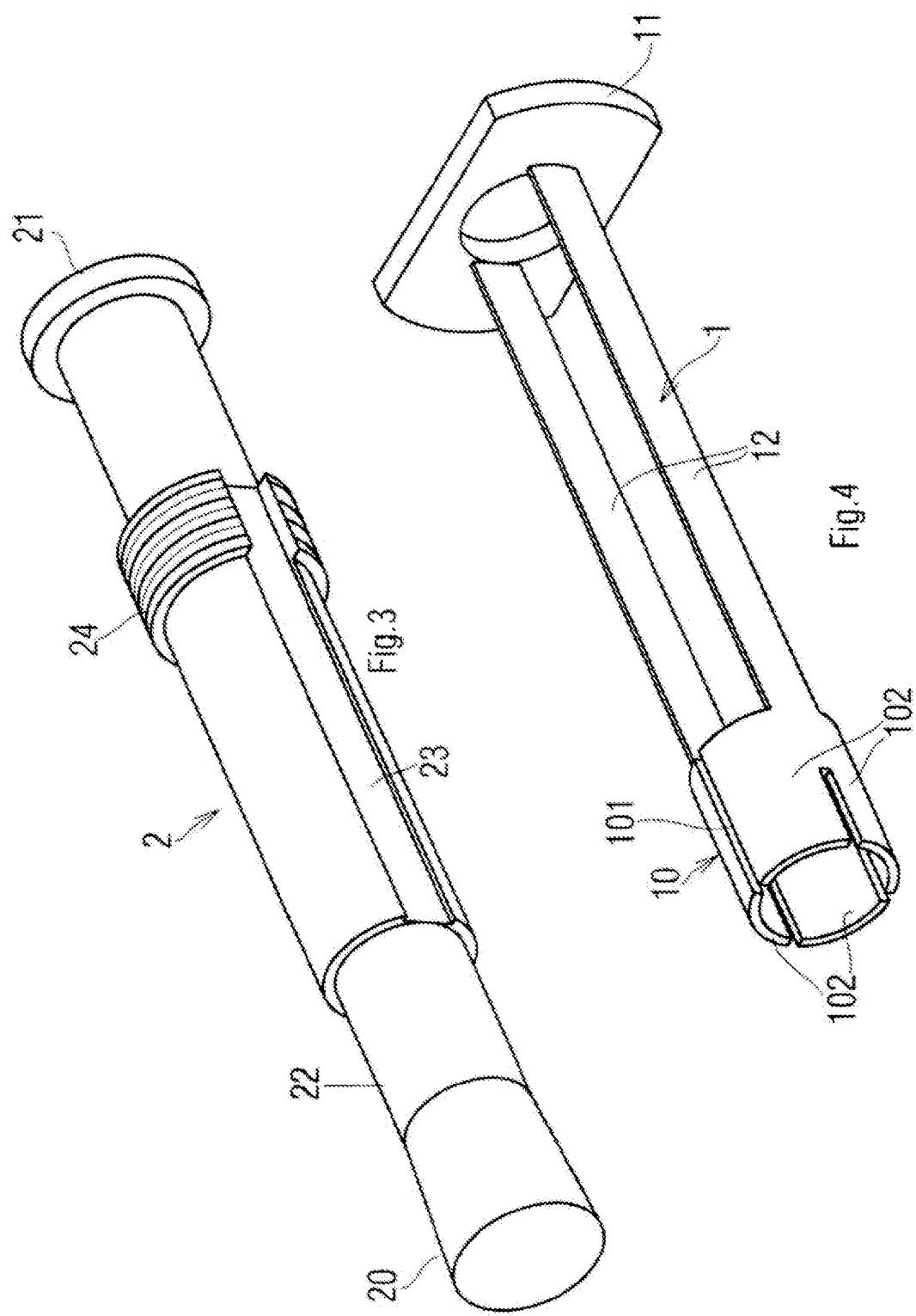

REMOVABLE ANCHORING DEVICE USABLE AS A SUSPENSION BOLT

GENERAL TECHNICAL BACKGROUND AND PRIOR ART

Figure 5:
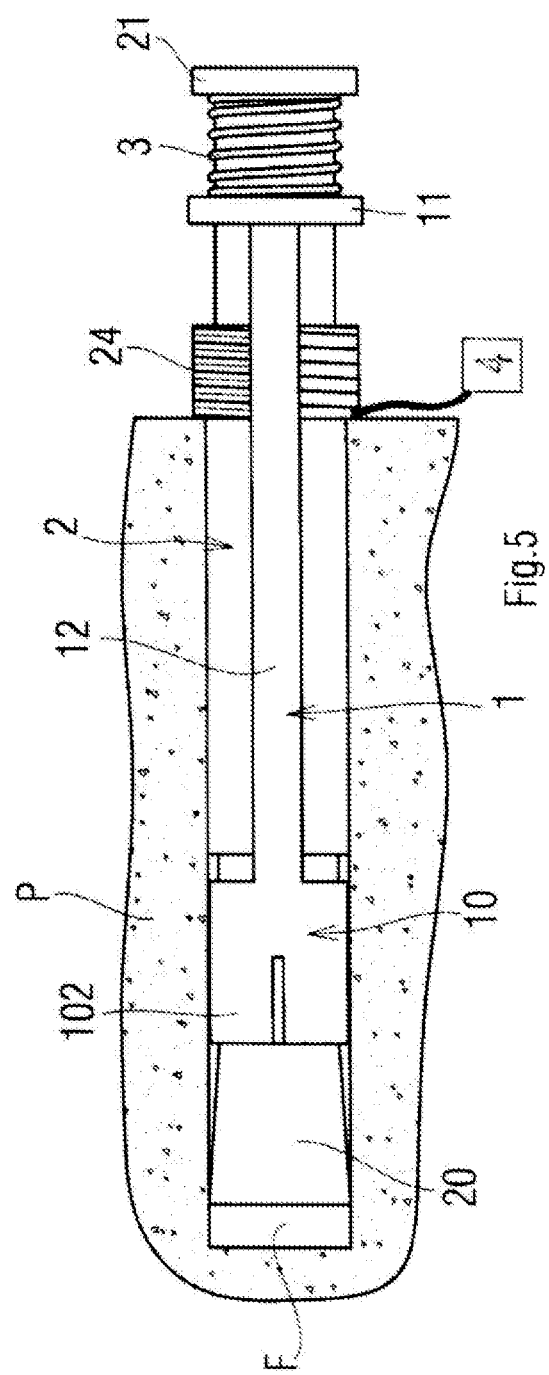

The present invention relates to the field of equipment used both for rock-climbing and for suspending or fixing objects to a rock or concrete or other wall and relates more particularly to a removable anchoring bolt. The invention also relates to the field of hoisting heavy loads (girders, concrete blocks, etc.).

Anchoring devices designed to be anchored in holes drilled in solid materials constituted by rock or concrete are known from the state of the art. Certain of these devices present the drawback of being usable once only and of not being able to be removed after use. Furthermore, they can only be placed by means of fastening tools and are therefore difficult to use in the field of rock-climbing, load hoisting or whenever a wall has to be left devoid of any device.

Removable anchoring devices, of bolt type, able to be used to suspend objects on walls are also known from the state of the art. The advantage of such devices is to be able to be easily removed from the drilled holes which accommodate them to be placed in other drilled holes.

Such devices are in particular known from U.S. Pat. No. 3,861,636 and from Patent application FR 2,411,328.

A removable anchoring device for rock-climbing able to be removed from the wall after use is also known from Patent application WO 97/32631.

A cable anchoring, for rock-climbing, difficult to remove from the wall when it has been heavily stressed, is also known from U.S. Pat. No. 6,729,821.

Typically, removable anchoring devices of the bolt type are designed to each be engaged in a hole drilled in the wall and are each formed by a female body that is radially expandable in the drilled hole, receiving with axial sliding a male body in the form of a cylindrical shank provided at its distal end with a frustum-shaped expansion head compelled, by movement of the shank, to penetrate into the female body in order to dilate the latter. The relative axial movement of the male body with a view to dilating the female body results from the action of a flexible part, threaded onto the male body and fitted in compression between the female body and a rim of the proximal end of the male body. Due to the effect of its expansion, the female body is applied against the surface of the drilled hole, which makes a connection by adherence and secures the bolt in the drilled hole. To release the anchoring bolt, the user applies an axial force on the male body so that its head is at least partially disengaged from the female body. In this way, the link by obstacle is broken and the bolt can then be separated from the wall.

Usually the male body is equipped to receive loads, and has for this reason to have a sufficiently large cross-section to withstand the mechanical stresses generated by the latter.

The shank forming the male body of prior art devices, due to the design of the latter, presents a substantially smaller diameter than that of the hole to be drilled in the wall. For this reason, on account of the diameter constraint imposed for the shank, the female body and the drilled hole are thereby over-dimensioned. Furthermore to prevent the shank from adopting an oblique position in the hole due to the effect of the load, the female body has to be sufficiently long to present a support span, to the rear of its area subjected to expansion, ensuring coaxiality of the shank and of the drilled hole.

GENERAL PRESENTATION OF THE INVENTION

The object of the present invention is to palliate the shortcomings mentioned in the foregoing by proposing a removable fixing device of the previously mentioned kind, designed in such a way that the diameter of the shank can correspond to the diameter of the drilled hole, give or take the functional clearance, while at the same time being of simplified design.

The invention relates to a removable anchoring device designed to be inserted in a hole drilled in a wall and intended to support a mechanical load, comprising:

a female body provided with a radially expandable front area, designed to be inserted in the drilled hole, and with a rear stop designed to be outside the hole, a male body engaged by sliding in the female body comprising at its front end an expansion head designed to penetrate, by axial movement of the female body and of the male body with respect to one another, into the radially expandable area of the female body in order to dilate it and to apply it against the cylindrical surface of the hole, said male body comprising a rear stop designed to be outside the hole, a flexible compression part engaged on the male body and fitted in compression between the stop of the female body and the stop of the male body, in order to bias the male body and the female body in the direction of engagement of the expansion head in the radially expandable area.

The invention is remarkable in that the male body, in front of and away from the rear stop which the female body comprises, presents a stop part determining a penetration length into the drilled hole.

The stop part determines a minimum insertion length enabling a particularly dependable fixing of the device in the wall. In addition, such an arrangement, after insertion of the device in the hole drilled in the wall, enables a sufficient distance to be maintained between the wall and the stop of the female body so that the latter can be used as a hand hold for handling the female body on the shank. Furthermore, the elastic compression part ensures instantaneous locking of the device in the hole drilled in the wall. This device presents the advantage of being able to be fitted and removed quickly with only one hand.

In preferred manner, the stop part is designed to receive or block suspension means of the load. Thus, unlike the prior art where the connection to the load is made at the level of a stop at a distance from the wall, the invention enables a connection to be made as close as possible to the wall, which limits the overhang of the anchoring device, thereby improving its ruggedness and lifetime. Thus, for the same load, the anchoring device can be inserted in a hole of smaller diameter.

In preferred manner, the stop part is a ferrule, which is preferably threaded.

In preferred manner, the stop part is formed by the front part of a shackle rigidly fixed to the shank constituting the male part, or articulated on the latter, said shackle constituting a load suspension means. A hook-shaped part can thus be connected up to said shackle rapidly and in practical manner.

According to a preferred feature, the male body, in the form of a cylindrical shank, comprises a narrowed section, immediately to the rear of the expansion head, on which the expandable part of the female body is fitted. Preferably, the narrowed section is cylindrical.

Preferably, the male body comprising at least one longitudinal groove, the female body between the radially expandable area and the rear stop comprises at least one handling and guiding strip slidingly engaged in the longitudinal groove. The longitudinal movement of the male body with respect to the female body is thereby guided.

The part of each handling strip slidingly engaged in the corresponding groove is furthermore preferably sunk in said groove in order to avoid any radial bulge.

According to a preferred feature, the male body comprising a narrowed section on which the expandable part of the female body is fitted, the longitudinal groove opens into said narrowed section of the male body.

Preferably, the male body comprising at least two diametrically opposite longitudinal grooves, the female body comprises at least two handling strips slidingly engaged in the longitudinal grooves, between the radially expandable area and the rear stop. Preferably, the grooves pass through the stop part from one side to the other.

According to a preferred feature, the part of the male body designed to penetrate into the drilled hole presents a diameter that is greater than or equal to the largest diameter of the expansion head and to the largest diameter of the radially expandable area of the female body.

Preferably, the rear stop of the male body is arranged to the rear of and away from the rear stop of the female body.

In preferred manner, the rear stop of the female body comprises a pass-through hole in which the male body is engaged in freely sliding manner.

Preferably, the internal volume delineated by the radially expandable area of the female body is frustum-shaped in order to neatly follow the frustum shape of the expansion head to transmit the dilatation force in uniform manner.

The invention further relates to a removable anchoring device designed to be inserted in a hole drilled in a wall, comprising:
- a female body provided with a radially expandable front area designed to be inserted in the drilled hole, and with a rear stop designed to be outside the hole,
- a male body slidingly engaged in the female body comprising, at its front end, an expansion head designed to penetrate, by axial movement of the female body and of the male body with respect to one another, into the radially expandable area of the female body in order to dilate it and to apply it against the cylindrical surface of the hole, said male body comprising a rear stop designed to be outside the hole,
- a flexible compression part engaged on the male body and fitted in compression between the stop of the female body and the stop of the male body, in order to bias the male body and the female body in the direction of engagement of the expansion head in the radially expandable area.

The device is remarkable in that:
immediately to the rear of the expansion head, the male body, in the form of a rigid cylindrical shank, comprises a cylindrical narrowed part on which the expandable part of the female body is threaded,
the male body comprises at least one longitudinal groove between the narrowed part and its rear area,
between the radially expandable area and the rear stop, the female body comprises at least one handling strip slidingly engaged in the longitudinal groove, the part of the strip slidingly engaged in the groove being sunk in said groove,
the part of the male body designed to penetrate into the drilled hole presents a diameter that is greater than or equal to the largest diameter of the expansion head and to the largest diameter of the radially expandable area of the female body, and
the male body, in front of and away from the rear stop which the female body comprises, presents a stop part determining a minimum penetration length of the device into the drilled hole.

By means of these arrangements, the diameter of the male body, or at least the part of the male body designed to be engaged in the drilled hole, can now present an equal diameter to the diameter of said hole, give or take the functional clearance, the female body as far as the radially expandable part and the handling strips are concerned being contained in the cylindrical envelope defined by the cylindrical surface of the part of the male body designed to penetrate into the drilled hole.

The stop part as described in the foregoing determines a minimum insertion length. This minimum length will be sufficient to ensure a particularly dependable fixing of the device in the wall. Furthermore, such an arrangement, after insertion of the device in the hole drilled in the wall, enables a sufficient clearance to be maintained between the wall and the stop of the female body so that the latter can be used as a hand hold for moving the female body on the shank.

Furthermore, the elastic compression part ensures instantaneous locking of the device in the hole drilled in the wall.

This device presents the advantage of being able to be fitted and removed quickly with only one hand.

According to another feature of the invention, the male body, between the narrowed section and its rear area, comprises at least two diametrically opposite longitudinal grooves, and the female body, between the radially expandable area and the rear stop, comprises at least two handling strips slidingly engaged in the longitudinal grooves.

Preferably, the male body, immediately behind the head, comprises a cylindrical narrowed section on which the expandable part of the female body is threaded with the possibility of axial sliding.

According to another feature of the invention, the stop part is provided with load suspension means. The load is thus applied as close as possible to the wall, which reduces the flexural stresses undergone by the part of the male body outside the hole.

According to another feature of the invention, the stop part is formed by the front part of a shackle fixed to the shank, said shackle constituting the load suspension means.

Alternatively, according to another feature of the invention, the stop part is constituted by an annular flange, which is preferably cylindrical, the two longitudinal grooves passing through said flange from one side to the other.

According to another feature of the invention, the radially expandable area of the female body comprises at least one pass-through slot dividing the radially expandable area into two clamping jaws one of which is fixed to the end of one of the strips and the other of which is fixed to the end of the other strip.

Preferably, the rear stop of the female body is equipped with a central tapped pass-through hole in which the male body is engaged in freely sliding manner, said stop constituting a hand hold.

Preferably, along a diametral plane of the area, each jaw is provided with a median slot opening out at the end.

According to a practical embodiment, the radially expandable area comprises two pass-through diametral slots. These slots divide the radially expandable area into two clamping jaws.

According to another feature of the invention, the outer surface of the radially expandable area comprises rough spots to strengthen the anchoring of the device in the drilled hole.

The invention will be better understood on reading of the following description, given for example purposes only and referring to the appended drawings in which:

FIG. 1 is a perspective view of the device according to the invention in an active state, FIG. 2 is a perspective view of the device according to the invention in an inactive state, FIG. 3 is a perspective view of a male body of the device according to the invention, FIG. 4 is a perspective view of a female body of the device according to the invention, and FIG. 5 shows a device engaged in block manner in a drilled hole.

DESCRIPTION OF ONE OR MORE EMBODIMENTS AND IMPLEMENTATION MODES

As represented, the removable anchoring device according to the invention, of the bolt for rock-climbing type, is designed to be engaged in removable manner in a hole F drilled beforehand in a wall P in order to be embedded therein. This anchoring device is designed to support a mechanical load. This mechanical load is mainly applied on the anchoring device in radial manner and generates flexural stresses.

The anchoring device according to the invention comprises on the one hand a female body 1 provided with a flexible, radially expandable front area 10, and on the other hand a male body 2, substantially in the form of a cylindrical shank, slidingly engaged in female body 1.

With reference to FIGS. 1 and 2, this male body 2 comprises at its front end an expansion head 20 biased towards and into the expandable area 10 of female body 1 by a flexible part 3 engaged on male body 2 and fitted in compression between a rear stop 11 of female body 1 and a rear stop 21 of male body 2, rear stop 21 of male body 2 being arranged behind and away from rear stop 11 of female body 1. Penetration of expansion head 20 into expandable area 10 leads to radial dilation of the latter. What is meant by radial dilation is that expandable part 10 of female body 1 is applied firmly against the cylindrical surface of drilled hole F in order to ensure axial immobilisation, by adherence, of the anchoring device in the wall P receiving the latter.

As represented in FIG. 4, female body 1, made from metal or from plastic or synthetic material having the required elasticity and adherence characteristics, comprises two handling and guiding strips 12 between the radially expandable area 10 and rear stop 11.

These handling strips 12, rigidly fixed both to expandable area 10 and to rear stop 11, connect the latter to one another and are designed to transmit axial thrust forces, applied on rear stop 11 by flexible compression part 3, to expandable area 10. They also enable removal forces to be transmitted to expandable area 10. In other words, handling strips 12 enable any axial movement of rear stop 11 to be communicated to expandable area 10.

Still with reference to FIG. 4, the radially expandable area 10 of female body 1 is in the form of a split cylindrical ring. In a diametral geometric plane, this ring presents two opposite slots 101 dividing said ring into two jaws 102 one of which is fixed to the end of one of handling strips 12 and the other of which is fixed to the end of the other handling strip 12.

Advantageously, each jaw 102, in a diametral plane of expandable area 10, can be provided with a median slot passing through the whole thickness of the latter and opening onto the end.

Such arrangements increase the possibility of deformation of radially expandable area 10 and of jaws 102 due to the effect of the action of expansion head 20, and consequently the ability of the latter to completely follow the shape of drilled hole F of wall P. The whole of the external surface of the two jaws 102 is thus used to make the contact with hole F drilled in wall P, and the strength of the adherence forces are consequently optimised.

In the preferred embodiment, with reference to FIG. 4, rear stop 11 of female body 1 comprises a central pass-through hole in which male body 2 is engaged in freely sliding manner as represented in FIGS. 1 and 2. This rear stop 11 substantially follows a rectangular contour and advantageously constitutes a hand hold for making the anchoring device move from its active position to its inactive position.

To move the anchoring device between its active position, called anchoring position, and its inactive position, called release position, the distance between rear stop 11 of female body 1 and stop 21 of male body 2 is modified by user action on rear stop 11 which performs a function of hand hold, in the manner of a syringe.

In the active position, called anchoring position, of the anchoring device, with reference to FIG. 1, radially expandable area 10 of female body 1 is dilated by expansion head 20 of male body 2. In the inactive position, called release position, radially expandable area 10 of female body 1 is located axially set back from expansion head 20 of male body 2 as illustrated in FIG. 2.

It should be noted that the anchoring device, at rest, is normally active due to the action of flexible part 3 which tends to keep stops 11, 21 apart. In this state, the anchoring device cannot be inserted in hole F drilled in wall P. To perform this insertion, the user acts on the hand hold, i.e. rear stop 11, to move female body 1 axially on male body 2 to the inactive position, this movement taking place against the action exerted by flexible part 3.

With reference to FIG. 3, according to the preferred embodiment, expansion head 20 forming part of male body 2 is frustum-shaped. The internal volume delineated by jaws 102 of female body 1, a volume designed to accommodate expansion head 20 of male body 2, is of cylindrical shape as illustrated in FIG. 4. In preferred manner, the internal volume delineated by expandable part 10 of female body 1, in particular jaws 102 of female body 1, is frustum-shaped in order to follow the frustum shape of expansion head 20 so as to transmit the dilatation force in uniform manner.

With reference to FIG. 3, male body 2, immediately to the rear of expansion head 20, comprises a narrowed section 22 on which expandable part 10 of female body 1 is fitted with the possibility of axial sliding. A narrowed section 22 of cylindrical shape has been presented in this example but narrowed section 22 could of course be of different shape, for example conical or formed by slopes.

Furthermore, again with reference to FIG. 3, male body 2 presents two diametrically opposite longitudinal grooves 23 opening onto the cylindrical narrowed section 22, in which handling strips 12 of male body 1 are slidingly engaged, the part of each handling strip 12 slidingly engaged in the corresponding groove 23 being sunk in said groove 23 as illustrated in FIGS. 1 and 2. In this way, each handling strip 12 does not form any bulge on male body 2 and is located behind the cylindrical envelope formed by the latter. Such an arrangement, in particular when the anchoring device is fitted in hole F drilled in wall P, enables free sliding of handling strips 12 in longitudinal grooves 23.

Furthermore the part of male body 2 designed to penetrate into hole F presents a larger or equal diameter to the largest diameter of expansion head 20 and to the largest diameter of radially expandable area 10 of female body 1. Due to this arrangement, the diameter of the part of male body 2 designed to penetrate into drilled hole F and the diameter of this hole F could be substantially identical so as to form a mechanical embedment after securing. Such a type of connection eliminates all degrees of freedom of movement.

The rear area of male body 2 can be formed by a cylindrical narrowed section, the diameter of this narrowed section being equal to the value of the diameter of said body measured at the bottom of groove 23. The rear area is advantageously equipped with a thread to accommodate stop 21, the latter then being equipped with an axial tapping. In a practical embodiment form, this stop is formed by a nut.

Advantageously, with reference to FIG. 3, male body 2 presents a stop part 24 in front of and away from stop 11 of female body 1. This stop part 24 is designed to be applied against wall P around the opening of drilled hole F. This stop part 24 thus determines a penetration length of the anchoring device in hole F. The value of this length complies with safety requirements. It is sufficient to efficiently oppose removal of the device from hole F which accommodates it and to prevent the material from exploding due to the action of the expansive force. It is also sufficient for the tear cone which the anchoring device determines to be relatively large.

Before placing anchoring device in drilled hole F, the user moves stops 11, 21 towards one another by means of the hand hold, which constrains flexible compression 3 in order to reduce the radial dimensional of the anchoring device which can thus be inserted without trouble in hole F.

To be fitted in hole F drilled beforehand, the anchoring device is held by the user in its inactive position and is then engaged in said hole F applying stop part 24 against wall P. Then the user releases the pressure he is exerting on stop 11, i.e. on the hand hold, so that female body 1 of the anchoring device, due to the effect of the action of flexible part 3, is pushed forwards to perform securing of anchoring device in drilled hole F. The movement is guided by strips 12 of female body 1 which collaborate with grooves 23 of male body 2. Following the movement, expansion head 20 of male body 2 penetrates into radially expandable area 10 of female body 1 which dilates radially and comes into contact with the cylindrical surface of hole F to enable anchoring device to be secured in hole F as illustrated in FIG. 5.

It should be noted that when this securing movement takes place, the male part 2 of the anchoring device is fixed with respect to drilled hole F, only the female part 1 is removable in the direction of engagement in hole F. Securing of the anchoring device, unlike prior-art solutions, is not achieved by movement of male body 2 in the direction of its extraction from drilled hole F. The length of the anchoring device in drilled hole F therefore remains constant.

Stop part 24 advantageously constitutes a load suspension part or alternatively is equipped with such a part. What is meant by load suspension part is for example a shackle, a ring, a plate, a bolt hanger, etc. For example, a load 4 is attached to stop part 24 as illustrated in FIG. 5.

According to a first embodiment, stop part 24 is constituted by a cylindrical flange formed on the shank constituting male body 2. This flange can be a part that is fitted on said shank and secured to the latter by any means known to the person skilled in the trade. The two grooves 23 pass through the cylindrical flange from side to side. This flange is advantageously threaded to receive the load suspension part by screw-fastening.

According to this embodiment, with reference to FIG. 5, load 4 is applied immediately next to the flush-mounting which greatly minimises the flexural stresses.

According to another embodiment, stop part 24 is constituted by the front part of a shackle rigidly fixed to the shank constituting male body 2, or articulated on the latter, said shackle constituting the load suspension means.

For example purposes in the field of individual protection equipment (rock-climbing, caving, working at heights, etc.), the user suspends himself from the anchoring device by fixing a rope on stop part 24 which comprises for example a shackle or a bolt hanger. For this purpose, the rope comprises a snap-hook designed to collaborate with the shackle or the bolt hanger securedly affixed to stop part 24. The forces are thus applied directly on stop part 24 which is close to the opening of hole F, thereby limiting overhang. Stops 11, 21 and flexible compression part 3 are therefore not stressed during use, which is advantageous.

In order to perform removal of the anchoring device, the user acts on stops 11, 21 in the direction of moving the latter towards one another in order to free radially expandable area 10 of expansion head 20 which greatly reduces the adherence forces between wall P and radially expandable area 10 of female body 1.

Finally it should be noted that fitting and removal of the anchoring device are performed without any tooling even if the device has been greatly stressed, unlike existing solutions.

The present invention can naturally receive any arrangements and variants of the range of technical equivalents without departing from the scope of the present patent as defined by the claims hereunder.

The invention finds a particularly advantageous application in the field of hoisting heavy loads (girders, concrete blocks, etc.).

The invention claimed is:

1. A removable anchoring device designed to be inserted in a hole drilled in a wall and intended to support a mechanical load, comprising:
    a female body provided with a radially expandable front area, designed to be inserted in the drilled hole, and with a rear stop designed to be outside the hole;
    a male body engaged by sliding in the female body comprising at its front end an expansion head designed to penetrate, by axial movement of the female body and of the male body with respect to one another, into the radially expandable area of the female body in order to dilate it and to apply it against the cylindrical surface of the hole, said male body comprising a rear stop designed to be outside the hole, the male body further comprising at least one longitudinal groove, wherein the female body between the radially expandable area and the rear stop comprises at least one handling and guiding strip slidingly engaged in the at least one longitudinal groove; and
    a flexible compression part engaged on the male body and fitted in compression between the stop of the female body and the stop of the male body, in order to bias the male body and the female body in the direction of engagement of the expansion head in the radially expandable area,
    wherein the male body, in front of and away from the rear stop which the female body comprises, presents a stop part determining a penetration length into the drilled hole.

2. The device according to claim 1, wherein the stop part is designed to receive or to block suspension means of the load.

3. The device according to claim 1, wherein the stop part is a ferrule, which is threaded.

4. The device according to claim 1, wherein the stop part is formed by the front part of a shackle rigidly fixed to a shank constituting the male part, or articulated on a latter, said shackle constituting a load suspension means.

5. The device according to claim 1, wherein the male body, in the form of a cylindrical shank, comprises a narrowed section, immediately to the rear of the expansion head, on which the expandable part of the female body is fitted.

6. The device according to claim 5, wherein the narrowed section is cylindrical.

7. The device according to claim 1, wherein the part of each handling strip slidingly engaged in the corresponding groove is sunk in said groove.

8. The device according to claim 1, wherein, the male body comprising a narrowed section on which the expandable part of the female body is fitted, the at least one longitudinal groove opens into said narrowed section of the male body.

9. The device according to claim 6, wherein the male body comprising at least two diametrically opposite longitudinal grooves, the female body comprises at least two handling strips slidingly engaged in the longitudinal grooves, between the radially expandable area and the rear stop.

10. The device according to claim 9, wherein the grooves pass through the stop part from one side to the other.

11. The device according to claim 1, wherein the part of the male body designed to penetrate into the drilled hole presents a diameter that is greater than or equal to the largest diameter of the expansion head and to the largest diameter of the radially expandable area of the female body.

12. The device according to claim 1, wherein the rear stop of the male body is arranged to the rear of and away from the rear stop of the female body.

13. The device according to claim 1, wherein the rear stop of the female body comprises a pass-through hole in which the male body is engaged in freely sliding manner.

14. The device according to claim 1, wherein the internal volume delineated by the radially expandable area of the female body is frustum-shaped.

* * * * *